(12) United States Patent
Lu et al.

(10) Patent No.: US 11,605,858 B2
(45) Date of Patent: Mar. 14, 2023

(54) BATTERY, BATTERY PACK, AND VEHICLE

(71) Applicant: BYD COMPANY LIMITED, Guangdong (CN)

(72) Inventors: Peng Lu, Shenzhen (CN); Luxia Jiang, Shenzhen (CN); Xinyue Wang, Shenzhen (CN); Keli Yang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 17 days.

(21) Appl. No.: 16/963,113

(22) PCT Filed: Jan. 10, 2019

(86) PCT No.: PCT/CN2019/071169
§ 371 (c)(1),
(2) Date: Jul. 17, 2020

(87) PCT Pub. No.: WO2019/141129
PCT Pub. Date: Jul. 25, 2019

(65) Prior Publication Data
US 2021/0050581 A1   Feb. 18, 2021

(30) Foreign Application Priority Data
Jan. 18, 2018 (CN) .......................... 201810050360.0

(51) Int. Cl.
*H01M 50/55* (2021.01)
*H01M 50/20* (2021.01)
(Continued)

(52) U.S. Cl.
CPC ......... *H01M 50/20* (2021.01); *H01M 50/531* (2021.01); *H01M 50/55* (2021.01); *H01M 50/553* (2021.01); *H01M 2220/20* (2013.01)

(58) Field of Classification Search
CPC .. H01M 50/543; H01M 50/20; H01M 50/179; H01M 50/188; H01M 50/55;
(Continued)

(56) References Cited

U.S. PATENT DOCUMENTS

2003/0186113 A1* 10/2003 Hashimoto ......... H01M 50/172
429/94
2003/0203280 A1* 10/2003 Hamada .............. H01M 50/155
429/185
(Continued)

FOREIGN PATENT DOCUMENTS

CN    101479865 A    7/2009
CN    201478393 U    5/2010
(Continued)

OTHER PUBLICATIONS

English Translation of International Search Report from PCT/CN2019/071169 dated Mar. 29, 2019.

*Primary Examiner* — Kiran Quraishi Akhtar
(74) *Attorney, Agent, or Firm* — Calfee, Halter & Griswold

(57) ABSTRACT

A battery, a battery pack, and a vehicle are disclosed. The battery includes a housing having a sealed chamber, a core packaged in the sealed chamber, and a first terminal and a second terminal respectively mounted to the housing, where the first terminal is electrically connected to the housing, and the second terminal is insulated from the housing. The battery further includes a first tab and a second tab respectively led out from the core, the first tab being electrically connected to the housing, the first tab being electrically connected to the first terminal through the housing, and the second tab being electrically connected to the second terminal.

11 Claims, 3 Drawing Sheets

(51) Int. Cl.
  *H01M 50/531*   (2021.01)
  *H01M 50/553*   (2021.01)
(58) Field of Classification Search
  CPC ............. H01M 50/559; H01M 50/107; H01M 50/531; H01M 10/613; H01M 10/625; H01M 10/647; H01M 10/654; H01M 10/637; H01M 2200/00; H01M 2220/20; H01M 50/553; Y02E 60/10
  See application file for complete search history.

(56) References Cited

U.S. PATENT DOCUMENTS

| | | | |
|---|---|---|---|
| 2005/0118501 A1* | 6/2005 | Hashimoto | H01M 50/171 |
| | | | 429/180 |
| 2009/0064487 A1 | 3/2009 | Hashimoto et al. | |
| 2009/0159354 A1* | 6/2009 | Jiang | H01M 50/572 |
| | | | 180/68.5 |
| 2011/0195286 A1* | 8/2011 | Aota | H01M 10/0587 |
| | | | 429/94 |
| 2013/0273404 A1* | 10/2013 | Ochi | H01M 10/647 |
| | | | 429/99 |

FOREIGN PATENT DOCUMENTS

| | | |
|---|---|---|
| CN | 102306739 A | 1/2012 |
| CN | 204045649 U | 12/2014 |
| CN | 204130661 U | 1/2015 |
| CN | 204927440 U | 12/2015 |
| CN | 207818737 U | 9/2018 |
| DE | 102014019505 A1 | 6/2016 |
| JP | 2003077453 A | 3/2003 |
| JP | 2003297413 A | 10/2003 |
| JP | 2005166571 A | 6/2005 |
| JP | 2013020731 A | 1/2013 |
| WO | 2012057322 A1 | 5/2012 |
| WO | 2014/166142 | 10/2014 |

* cited by examiner

BATTERY, BATTERY PACK, AND VEHICLE

CROSS-REFERENCE TO RELATED APPLICATIONS

This application is the National Stage of International Application No. PCT/CN2019/071169, filed on Jan. 10, 2019, which claims priority to Chinese Patent Application 201810050360.0 filed on Jan. 18, 2018, which are incorporated herein by reference in their entireties.

FIELD

This application relates to the field of batteries, and relates to a battery, a battery pack, and a vehicle.

BACKGROUND

A battery is a part of a cup, a tank, or another container or composite container that contains electrolyte and metal electrodes to generate a current, and is an apparatus that can convert chemical energy into electrical energy. The battery has a positive electrode and a negative electrode.

Generally, the battery includes a housing and a core packaged in the housing, where the housing includes a box body and a sealing cover covering the box body, and a terminal of the battery is connected to the sealing cover through a hole disposed on the sealing cover. A positive tab and a negative tab are respectively led out from the core.

In an existing battery structure, because both a positive terminal and a negative terminal of the battery are connected to the housing of the battery in an insulated manner, a flowing direction of a current of the battery is from the positive terminal to the positive tab, from the positive tab to the core, and then from the core to the negative terminal. As a result, the current of the battery is not uniform, and heating of the battery is not uniform either. In addition, because both the positive terminal and the negative terminal of the existing battery are connected to the housing of the battery in an insulated manner, a structure in which the terminals are mounted to the housing is complicated, resulting in an increase in manufacturing costs of the battery. In addition, because the current repeatedly flows through the core, the core is prone to heating, and heat is not easily dissipated, reducing service life of the battery.

SUMMARY

This application is intended to resolve at least one of the technical problems in the related art to some extent.

Therefore, an objective of this application is to provide a battery, where a current inside the battery is uniform and heating is uniform.

Another objective of this application is to provide a battery pack.

Still another objective of this application is to provide a vehicle.

An embodiment of a first aspect of this application provides a battery. The battery includes a housing having a sealed chamber, a core packaged in the sealed chamber, and a first terminal and a second terminal respectively mounted to the housing, where the first terminal is electrically connected to the housing, and the second terminal is insulated from the housing. The battery further includes a first tab and a second tab respectively led out from the core, where the first tab is electrically connected to the housing, the first tab is electrically connected to the first terminal through the housing, and the second tab is electrically connected to the second terminal.

According to the battery in this embodiment of this application, both the first terminal and the first tab led out from the core are electrically connected to the housing, in other words, the first tab is electrically connected to the first terminal through the housing, so that a current of the battery is uniform and heating of the battery is uniform. In addition, because a current passing through the first tab flows through the housing of the battery to the first terminal, so that heat of the battery can be dissipated through the housing, thereby increasing a heat dissipation area of the battery and improving service life and safety of the battery accordingly. In addition, the first terminal is electrically connected to the housing, for example, the first terminal can be directly welded to the housing. Therefore, as a whole, a mounting structure of the terminal mounted to the housing is relatively simple, thereby reducing manufacturing costs of the battery. In short, the current inside the battery is more uniform, heating of the battery is also more uniform, and the heat generated inside the battery can be dissipated through the housing of the battery, thereby improving service life of the battery. In addition, a connection structure of the terminal of the battery and the housing of the battery is relatively simple, thereby reducing manufacturing costs of the battery.

In some embodiments of this application, the first tab is led out from one end of the core, and the second tab is led out from the other end of the core.

In some embodiments of this application, the first tab is electrically connected to the housing through a first connection member.

In some embodiments of this application, the first connection member includes a first U-shaped plate, a closed end of the first U-shaped plate being disposed on the housing, an open end of the first U-shaped plate facing the sealed chamber, and the first tab being connected to a wall of a formed opening of the first U-shaped plate.

In some embodiments of this application, the first connection member includes the first U-shaped plate and a first lead-out sheet, the closed end of the first U-shaped plate being disposed on the housing, the open end of the first U-shaped plate facing the sealed chamber, and the first tab being electrically connected to the first U-shaped plate through the first lead-out sheet; one end of the first lead-out sheet being connected to the first tab, and the other end of the first lead-out sheet being connected to the wall of the formed opening of the first U-shaped plate.

In some embodiments of this application, the second tab is electrically connected to the second terminal through a second connection member.

In some embodiments of this application, the second connection member includes a second U-shaped plate, a closed end of the second U-shaped plate being connected to the second terminal, an open end of the second U-shaped plate facing the sealed chamber, and the second tab being connected to a wall of a formed opening of the second U-shaped plate.

In some embodiments of this application, the second connection member includes the second U-shaped plate and a second lead-out sheet, the closed end of the second U-shaped plate being connected to the second terminal, the open end of the second U-shaped plate facing the sealed chamber, and the second tab being electrically connected to the second U-shaped plate through the second lead-out sheet; one end of the second lead-out sheet being connected to the second tab, and the other end of the second lead-out sheet being connected to the wall of the formed opening of the second U-shaped plate.

In some embodiments of this application, the housing includes a cylindrical body with openings formed at both ends, a first sealing cover disposed at a lower end of the cylindrical body, and a second sealing cover disposed at an upper end of the cylindrical body; and the first tab is disposed at a lower end of the core, and the second tab is disposed at an upper end of the core.

In some embodiments of this application, both the first terminal and the second terminal are mounted to the second sealing cover.

In some embodiments of this application, the first terminal is a positive terminal, and the second terminal is a negative terminal.

An embodiment of a second aspect of this application provides a battery pack, including a plurality of batteries provided in this application, the battery pack further including an external connection member capable of electrically connecting the plurality of batteries. The plurality of batteries provided in this application are electrically connected to assemble the battery pack, so that a current in the battery pack is uniform, overall heating of the battery pack is uniform, and a heat of the battery pack is easily dissipated, thereby improving service life and safety of the battery pack.

An embodiment of a third aspect of this application provides a vehicle, and the vehicle is provided with the battery pack provided in this application. The battery pack provided in this application is applied to the vehicle, so that a uniform current can be provided for the vehicle, and safety of the vehicle can be improved.

Other aspects and advantages of this application will be given in the following description, some of which will become apparent from the following description or may be learned from practices of this application.

DESCRIPTION OF REFERENCE NUMERALS

1—Battery; 10—Housing; 100—Sealed chamber; 101—Cylindrical body; 102—First sealing cover; 103—Second sealing cover; 11—Core; 12a—First terminal; 12b—Second terminal; 13a—First tab; 120—Threaded hole; 13b—Second tab; 14—First connection member; 140—First U-shaped plate; 141—First lead-out sheet; 15—Second connection member; 151—Second lead-out sheet; 150—Second U-shaped plate; 2—Battery pack; 21—External connection member; 3—Vehicle.

DETAILED DESCRIPTION

In this application, unless otherwise stated, directional terms such as "up, down, left, and right" used herein are generally understood with reference to directions shown in the accompanying drawings and directions in an actual application, and "inner and outer" refer to inside and outside of a contour of a component.

Figure 1:
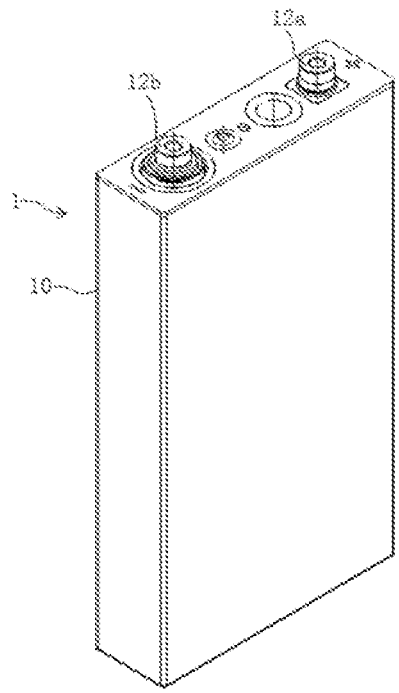
FIG. 1 is a schematic diagram of an overall structure of a battery according to an embodiment of this application.
Figure 2:
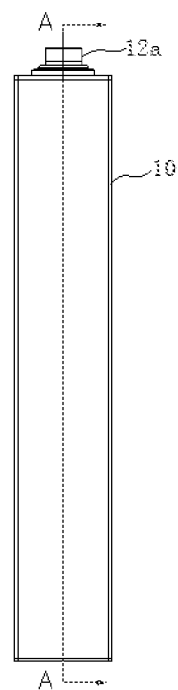
FIG. 2 is a schematic side structural view of the battery shown in FIG. 1.
Figure 3:
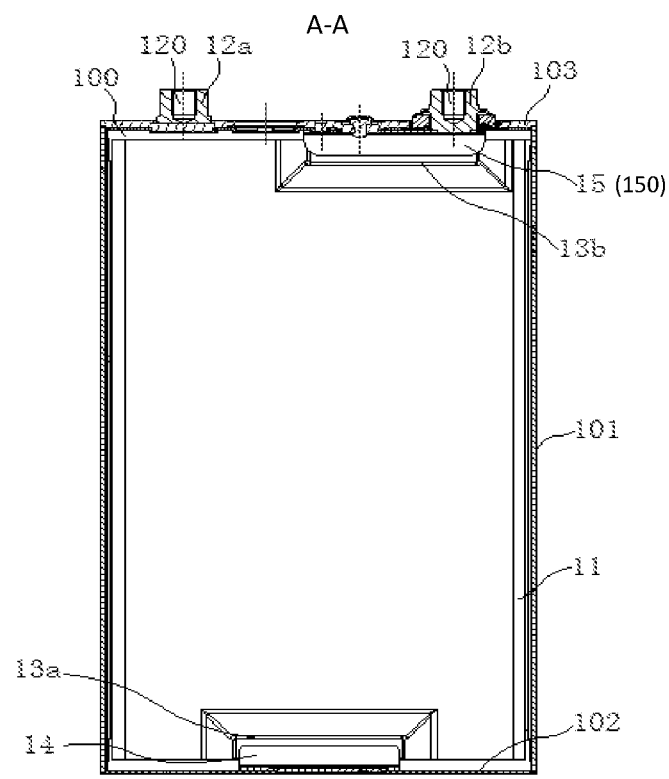
FIG. 3 is a schematic diagram of a cross-sectional structure taken along a line A-A in FIG. 2.

This application provides a battery 1. With reference to FIG. 1, FIG. 2, and FIG. 3, the battery 1 includes a housing 10 having a sealed chamber 100, a core 11 packaged in the sealed chamber 100, and a first terminal 12a and a second terminal 12b respectively mounted to the housing 10, where the first terminal 12a is electrically connected to the housing 10, and the second terminal 12b is insulated from the housing 10. The battery 1 further includes a first tab 13a and a second tab 13b respectively led out from the core 11, where the first tab 13a is electrically connected to the housing 10, the first tab 13a is electrically connected to the first terminal 12a through the housing 10, and the second tab 13b is electrically connected to the second terminal 12b.

Both the first terminal 12a and the first tab 13a led out from the core 11 are electrically connected to the housing 10, in other words, the first tab 13a is electrically connected to the first terminal 12a through the housing 10. In an embodiment, a flowing direction of a current in the battery 1 may be: first terminal 12a→ housing 10→ first tab 13a→ core 11→ second tab 13b→ second terminal 12b. Therefore, the current in the battery 1 is uniform and heating of the battery 1 is uniform.

In addition, because the current flows from the first terminal 12a through the housing 10 to the first tab 13a, so that heat of the battery 1 can be dissipated through the housing 10, thereby increasing a heat dissipation area of the battery 1 and improving service life and safety of the battery 1 accordingly.

In addition, the first terminal 12a is electrically connected to the housing 10, for example, the first terminal 12a can be directly welded to the housing 10. Therefore, as a whole, a mounting structure of the first terminal 12a mounted to the housing 10 is relatively simple, thereby reducing manufacturing costs of the battery 1. It should be noted that the second terminal 12b may be mounted to the housing 10 through an insulating sealing member in a sealing and insulating manner. The battery 1 may be a cuboid, and the core 11 may be a flat winding core or a laminated core.

In addition, the first terminal 12a may be a positive terminal, the second terminal 12b may be a negative terminal, the first tab 13a may be a positive tab, and the second tab 13b may be a tab. In this way, the housing 10 is not easily charged negatively, reducing a corrosion risk of the housing 10 and improving safety and service life of the battery 1. If the first tab 13a is a positive tab, the housing may be an aluminum housing, so that the corrosion risk of the housing 10 can be reduced and the safety and the service life of the battery 1 can be improved. Likewise, if the first tab 13a is a negative tab, the housing may be a copper housing to reduce corrosion and improve the safety and the service life. Certainly, for most batteries currently on the market, the aluminum housing is basically used as the housing of the battery. Therefore, in more embodiments of this application, the aluminum housing is used as the housing 10 of the battery 1, and the corresponding first tab 13a may be used as a positive tab.

In an embodiment of this application, the first tab 13a is led out from one end of the core 11, and the second tab 13b led out from the other end of the core 11. For example, in a direction shown in FIG. 3, the first tab 13a may be led out from a lower end of the core 11, and the second tab 13b may be led out from an upper end of the core 11. The first tab 13a and the second tab 13b are disposed at both ends of the core 11. In some embodiments, the first tab 13a and the second tab 13b may be disposed symmetrically in an up and down direction. In this way, the uniformity of the current and the uniformity of heating can be improved, thereby improving the safety and the service life of the battery 1.

On the basis that the first tab 13a and the second tab 13b are led out from the both ends of the core, in order to better implement the heat dissipation effect of the housing 10 and save the space of the battery 1, the first terminal 12a and the second terminal 12b are disposed together on an end cover corresponding to one of the both ends of the core 11 of the housing 10 (for example, a second sealing cover 103 in a specific embodiment below). In this way, the first tab 13a at the bottom is led out and is then electrically connected to the first sealing cover 102, and is electrically connected to the second sealing cover 103 through a main body of the housing 10, that is, a cylindrical body 101 mentioned below. In this case, the first terminal 12a is welded (electrically connected) to the second sealing cover 103. The current is led out from the bottom and is transferred in an up and down direction of the housing 10 to reach the top of the housing 10, which can effectively dissipate heat through the housing 10. In addition, in an existing solution, when the first tab 13a and the second tab 13b are respectively led out from the both ends of the core 11, terminal are generally disposed at an upper end and a lower end of the housing 10 respectively. Compared with the above solution, in the technical solution provided in this application, both the first terminal 12a and the second terminal 12b are located at the upper end of the housing 10, thereby saving space for one terminal in the up and down direction and improving space utilization. In addition, diversion and heat dissipation through the housing 10 can be maximized, thereby further improving the safety and the service life of the battery 1.

In addition, the housing 10 may include a cylindrical body 101 with openings formed at both ends, a first sealing cover 102 disposed at a lower end of the cylindrical body 101, and a second sealing cover 103 disposed at an upper end of the cylindrical body 101, thereby facilitating mounting of an internal component of the battery 1 such as the core 11. In an orientation shown in FIG. 3, the first sealing cover 102 may form a bottom wall of the housing 10, and the second sealing cover 103 may form a top wall of the housing 10. The first tab 13a is disposed at a lower end of the core 11, and the second tab 13b is disposed at an upper end of the core 11. Therefore, the electrical connection between the second terminal 12b and the second tab 13b can be facilitated, and the electrical connection between the first terminal 12a and the first tab 13a through the housing 10 can be facilitated, thereby facilitating mounting of the first terminal 12a and the second terminal 12b on a same end of the housing 10.

Generally, the cylindrical body 101 is connected to both the first sealing cover 102 and the second sealing cover 103 through welding, and the housing 10 is formed as a conductive component. Therefore, at least a current can be transferred from the first sealing cover 102 to the cylindrical body 101 and is transferred to the first terminal 12a through the second sealing cover 103. The second terminal 12b is insulated from the housing 10. In a specific embodiment, as shown in FIG. 3, the second terminal 12b is insulated from the second sealing cover 103. In particular, an insulating member may be disposed between the second terminal 12b and the second sealing cover 103; or a lamination may be disposed on the second sealing cover 103, and an insulating member is mounted in the lamination; or a lamination is insulated from the second sealing cover 103, and the second terminal 12b is disposed in the lamination.

A manner in which the second terminal 12b is mounted on the second sealing cover 103 is not limited, provided that the insulation between the second terminal 12b and the second sealing cover 103 can be achieved, and the electrical connection between the first terminal 12a and the first tab 13a through the housing 10 is not affected.

As shown in FIG. 3, both the first terminal 12a and the second terminal 12b may be mounted to the second sealing cover 103, that is, both the first terminal 12a and the second terminal 12b are located at a same end of the housing 10, thereby saving space and improving space utilization. Under the condition of a limited size of the battery 1, space of the sealed chamber 100 is as large as possible, thereby increasing a capacity of the core 11 and making a structure of the battery 1 more compact and lightweight.

It can be understood that the first tab 13a may be directly electrically connected to the housing 10. In some embodiments, the first tab 13a may be electrically connected to the housing 10 through a first connection member 14, and the first connection member 14 may be disposed on the housing 10. That is, the first tab 13a may be electrically connected to the housing 10 through the first connection member 14 disposed on the housing 10, and disposing of the first connection member 14 can facilitate the electrical connection between the first tab 13a and the housing 10. A structure of the first connection member 14 may vary, as long as the first tab 13a is electrically connected to the housing 10. In addition, the first connection member 14 may be connected to the housing 10 through welding. In particular, the first connection member may be connected to the first sealing cover 102.

In some embodiments, the first connection member 14 may include a first lead-out sheet 141 disposed on the housing 10, for example, a flexible connection sheet may serve as the first lead-out sheet 141. The first lead-out sheet 141 may be connected to the housing 10 through welding, and the first lead-out sheet 141 may be connected to the first sealing cover 102 that is a top wall of the housing 10 through welding, thereby facilitating disposing of the first tab 13a. In addition, the first tab 13a may be electrically connected to the first lead-out sheet 141 through welding.

Figure 4:
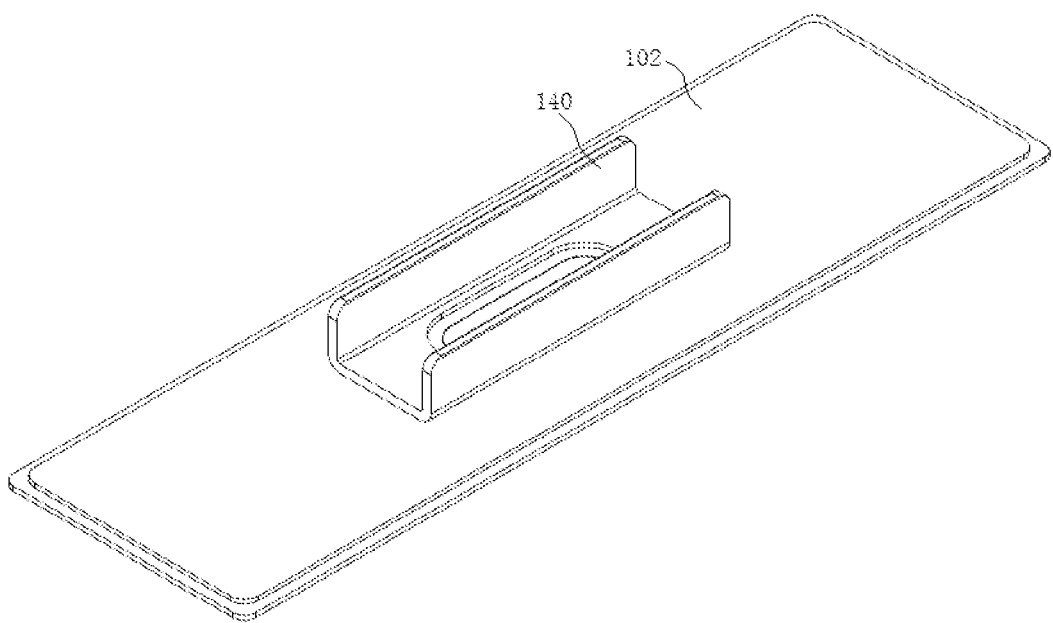
FIG. 4 is a partial schematic structural diagram of a first sealing cover of the battery shown in FIG. 1.

In addition, as shown in FIG. 4, the first connection member 14 may include a first U-shaped plate 140. A closed end of the first U-shaped plate 140 is disposed on the housing 10, for example, the closed end may be connected to the housing 10 through welding, and the closed end may be welded to a bottom cover of the housing 10, that is, the first sealing cover 102, to facilitate disposing of the first tab 13a. An open end of the first U-shaped plate 140 faces the sealed chamber 100, and the first tab 13a is connected to a wall of a formed opening of the first U-shaped plate 140. When a plurality of cores 11 are packaged in the housing 10, the provision of the first U-shaped plate 140 can facilitate the arrangement of the first tabs 13a respectively led out from the plurality of cores 11. For example, each first tab 13a may be correspondingly connected to a wall of a formed opening of the first U-shaped plate 140.

Figure 5:
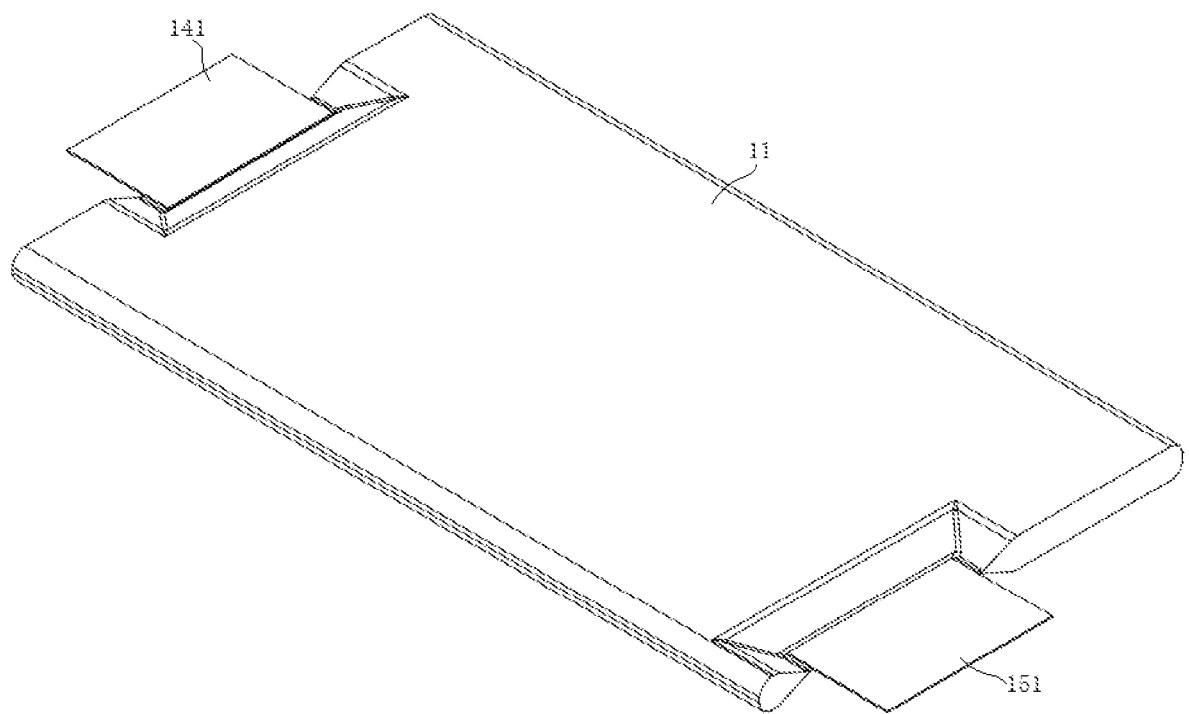
FIG. 5 is a partial schematic structural diagram of a core of the battery shown in FIG. 1, where a first lead-out sheet and a second lead-out sheet are respectively connected to two tabs of the core.

In addition, as shown in FIG. 4 and FIG. 5, the first connection member 14 may include the first U-shaped plate 140 and a first lead-out sheet 141, the closed end of the first U-shaped plate 140 being disposed on the housing 10, the open end of the first U-shaped plate 140 facing the sealed chamber 100, and the first tab 13a being electrically connected to the first U-shaped plate 140 through the first lead-out sheet 141; one end of the first lead-out sheet 141 being connected to the first tab 13a, and the other end of the first lead-out sheet 141 being connected to the wall of the formed opening of the first U-shaped plate 140. In other words, the first tab 13a is electrically connected to the housing through the first U-shaped plate 140 and the first lead-out sheet 141.

In order to facilitate the electrical connection between the second tab 13b and the second terminal 12b, as shown in FIG. 3, the second tab 13b may be electrically connected to the second terminal 12b through the second connection member 15. In particular, the second connection member 15 may be disposed on the housing 10, that is, the second tab 13b may be electrically connected to the second terminal 12b through the second connection member 15 disposed on the housing 10. A structure of the second connection member 15 may vary, as long as the second tab 13b is electrically connected to the second terminal 12b. In addition, the second connection member 15 may be connected to the housing 10 through welding. In particular, the second connection member may be connected to the second sealing cover 103. It should be noted that the second connection member 15 is disposed on the second sealing cover 103 in an insulated manner.

In some embodiments, the second connection member 15 may include a second lead-out sheet 151 disposed on the housing 10, for example, a flexible connection sheet may serve as the second lead-out sheet 151. The second lead-out sheet 151 may be disposed on the housing 10 through welding, and the second lead-out sheet 151 may be connected to the second sealing cover 103 that is a top wall of the housing 10 through welding, thereby facilitating disposing of the second tab 13b. In addition, the second tab 13b may be electrically connected to the second lead-out sheet 151 through welding.

In addition, the second connection member 15 may include a second U-shaped plate 150. A closed end of the second U-shaped plate 150 is disposed on the housing 10, for example, the closed end may be connected to the second terminal 12b through welding. An open end of the second U-shaped plate 150 faces the sealed chamber 100, and the second tab 13b is connected to a wall of a formed opening of the second U-shaped plate 150. When a plurality of cores 11 are packaged in the housing 10, disposing of the second U-shaped plate 150 can facilitate disposing of second tabs 13b respectively led out from the plurality of cores 11. For example, each second tab 13b may be correspondingly connected to a wall of a formed opening of the second U-shaped plate 150. It should be noted that structures of the second U-shaped plate 150 and the first U-shaped plate 140 are basically the same.

In addition, as shown in FIG. 4 and FIG. 5, the second connection member 15 may include the second U-shaped plate 150 and a second lead-out sheet 151, the closed end of the second U-shaped plate 150 being connected to the second terminal 12b, the open end of the second U-shaped plate 150 facing the sealed chamber 100, and the second tab 13b being electrically connected to the second U-shaped plate 150 through the second lead-out sheet 151; one end of the second lead-out sheet 151 being connected to the second tab 13b, and the other end of the second lead-out sheet 151 being connected to the wall of the formed opening of the second U-shaped plate 150. In other words, the second tab 13b is electrically connected to the second terminal 12b through the second U-shaped plate 150 and the second lead-out sheet 151.

Figure 6:
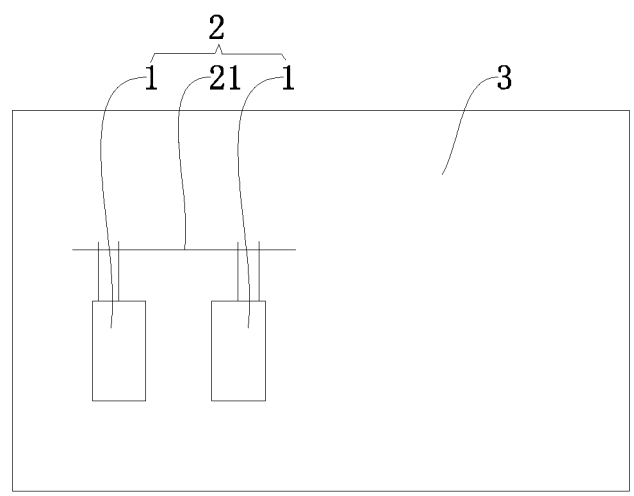
FIG. 6 is a schematic diagram of a vehicle according to an embodiment of this application.

With reference to FIG. 6, this application further provides a battery pack 2, including a plurality of batteries 1 provided in this application, the battery pack 2 further including an external connection member capable of electrically connecting the plurality of batteries 1. The plurality of batteries 1 provided in this application are electrically connected to assemble the battery pack 2, so that a current in the battery pack 2 is uniform, overall heating of the battery pack 2 is uniform, and a heat of the battery pack 2 is easily dissipated, thereby improving service life and safety of the battery pack 2.

It should be noted that the first terminal 12a and the second terminal 12b may be respectively provided with threaded holes 120 extending in a thickness direction of the corresponding terminal, and the threaded hole 120 is disposed on an end face that is of the corresponding terminal and that is away from the corresponding sealing cover. In particular, a threaded hole 120 extending in a thickness direction of the second terminal 12b is disposed on the second terminal 12b, a threaded hole 120 extending in a thickness direction of the first terminal 12a is disposed in the first terminal 12a, and the external connection member 21 (such as a connection member) is disposed, so that a plurality of fixing members such as bolts pass through the connection member and are screwed into the corresponding threaded holes 120 respectively. Therefore, a plurality of batteries 1 can be assembled into a battery pack 2 under the action of the external connection member 21.

With reference to FIG. 6, this application further provides a vehicle 3, and the vehicle 3 is provided with the battery pack 2 provided in this application. The battery pack 2 provided in this application is applied to the vehicle 3, so that a uniform current can be provided for the vehicle 3, and safety of the vehicle 3 can be improved.

The preferred embodiments of this application are described in detail above with reference to the accompanying drawings, but this application is not limited thereto. Various simple variations, including the combination of the technical features in any suitable manner, may be made to the technical solutions of this application within the scope of the technical idea of this application. To avoid unnecessary repetition, various possible combinations are not further described in this application. However, such simple variations and combinations shall also be considered as the content disclosed by this application and shall all fall within the protection scope of this application.

What is claimed is:

1. A battery, comprising:
a housing having a sealed chamber positioned within the housing,
a plurality of cores packaged in the sealed chamber, and
a first terminal and a second terminal respectively mounted to the housing,
wherein the first terminal is electrically connected to the housing, and the second terminal is insulated from the housing; and the battery further comprises a first tab and a second tab respectively led out from a first core of the plurality of cores, wherein the first tab is electrically connected to the housing through a first connection member, the first tab is electrically connected to the first terminal through the housing, and the second tab is electrically connected to the second terminal,
wherein the first connection member comprises a first U-shaped plate, wherein a closed end of the first U-shaped plate is disposed on the housing, an open end of the first U-shaped plate faces the sealed chamber, and the first tab is electrically connected to the first U-shaped plate through a first lead-out sheet, wherein one end of the first lead-out sheet is connected to the first tab and a second end of the first lead-out sheet is connected to a wall of a formed opening of the first U-shaped plate, and wherein the wall of the formed opening of the first U-shaped plate is connected to a second core of the plurality of cores, and wherein the housing comprises a cylindrical body with openings formed at both ends, a first sealing cover disposed at a lower end of the cylindrical body, and a second sealing cover disposed at an upper end of the cylindrical body; wherein the first tab is disposed at a lower end of the first core, and the second tab is disposed at an upper end of the first core.

2. The battery according to claim 1, wherein the first tab is led out from one end of the first core, and the second tab is led out from the other end of the first core.

3. The battery according to claim 1, wherein the second tab is electrically connected to the second terminal through a second connection member.

4. The battery according to claim 3, wherein the second connection member comprises a second U-shaped plate, wherein a closed end of the second U-shaped plate is connected to the second terminal, an open end of the second U-shaped plate faces the sealed chamber, and the second tab is connected to a wall of a formed opening of the second U-shaped plate.

5. The battery according to claim 4, wherein the second connection member comprises the second U-shaped plate and a second lead-out sheet, wherein the closed end of the second U-shaped plate is connected to the second terminal, the open end of the second U-shaped plate faces the sealed chamber, and the second tab is electrically connected to the second U-shaped plate through the second lead-out sheet; one end of the second lead-out sheet is connected to the second tab, and the other end of the second lead-out sheet is connected to the wall of the formed opening of the second U-shaped plate.

6. The battery according to claim 1, wherein both the first terminal and the second terminal are mounted to the second sealing cover.

7. The battery according to claim 1, wherein the first terminal is a positive terminal, and the second terminal is a negative terminal.

8. A battery pack, comprising a plurality of batteries according to claim 1, the battery pack further comprising an external connection member configured to electrically connect the plurality of batteries.

9. A vehicle, wherein the vehicle is provided with the battery pack according to claim 8.

10. The battery according to claim 1, wherein the first lead-out sheet comprises a flexible connection sheet.

11. The battery according to claim 1, wherein the second core has a corresponding first tab lead out from the second core, wherein the first tab of the second core is connected to the wall of the formed opening of the first U-shaped plate through a corresponding first lead-out sheet.

* * * * *